United States Patent Office 2,999,101
Patented Sept. 5, 1961

2,999,101
11-OXYGENATED 17-ALKYLSULFINYL- AND 17-ALKYLSULFONYLANDROST-4-EN-3-ONES
Raymond M. Dodson, Park Ridge, and Paul B. Sollman, Wilmette, Ill., assignors to G. D. Searle & Co., Chicago, Ill., a corporation of Delaware
No Drawing. Filed Aug. 13, 1959, Ser. No. 833,372
10 Claims. (Cl. 260—397.3)

The present invention relates to novel steroidal sulfoxides and sulfones and, more particularly, to 11-oxygenated 17-alkylsulfinyl- and 17-alkylsulfonylandrost-4-en-3-ones. The compounds of this invention can be represented by the structural formula

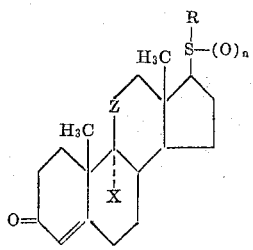

wherein Z is a member of the group consisting of carbonyl and β-hydroxymethylene radicals, X is selected from the group consisting of hydrogen and halogen atoms having an atomic weight less than 100, R is a lower alkyl radical, and n is a positive interger less than 3. Lower alkyl radicals represented by R are exemplified by methyl, ethyl, propyl, butyl, pentyl, hexyl, heptyl, octyl and the branched-chain isomers thereof.

Inasmuch as the sulfur atom assumes a tetrahedral configuration, the sulfoxides of this invention can exist in two steroisomeric forms, as shown by the partial formulae below:

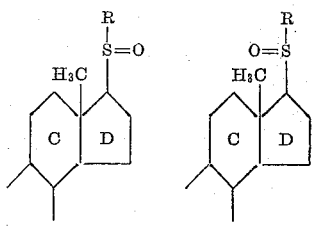

Although both isomeric forms of certain of the instant compounds have been isolated, an assignment of absolute configuration is beyond the scope of this invention. Furthermore, whereas the sulfur to oxygen linkage in the structural formulae supra has been designated as a double bond as a matter of convenience, this is not to be regarded as limiting in any way. Those persons skilled in the art will recognize that the precise nature of this bond is uncertain and that sulfones most probably comprise resonance hybrids of double bonds and coordinate bonds.

Starting materials suitable for the manufacture of the instant sulfones are 17-alkylsulfinyl- and 17-alkylsulfonylandrost-4-en-3-ones. A representative member of these groups of compounds is hydroxylated, for example by fermentation in the presence of a suitable microorganism such as *Rhizopus stolonifer* ATCC 6227-b, to afford the corresponding 11α-hydroxysulfoxide or 11α-hydroxysulfone. As is obvious to those persons skilled in the art, there are a variety of microorganisms which may be utilized in the latter transformation. Oxidation of the 11α-hydroxy compound, typically with chromium trioxide and pyridine, results in a 17-alkylsulfinyl- or 17-alkylsulfonylandrost-4-ene-3,11-dione. Reaction of a typical sulfoxide or sulfone of the latter group in benzene with ethylene glycol in the presence of p-toluenesulfonic acid followed by reduction of the 11-keto group with sodium borohydride in methanol and finally cleavage of the 3-ketal with dilute hydrochloric acid in methanol, results in the corresponding 11β-hydroxyandrost-4-en-3-one. Dehydration of a member of the latter group of compounds is effected, for example by treatment with methanesulfonyl chloride and pyridine in dimethylformamide, resulting in the corresponding 4,9(11)-dien-3-one. The latter dienes are converted to the corresponding 9α-bromo-11β-hydroxy derivatives, preferably by treatment in dioxane with N-bromoacetamide in the presence of aqueous perchloric acid. Transformation of the latter group of compounds to the 9β,11β-epoxyandrost-4-en-3-ones is accomplished, for instance, by treatment in ethanol with potassium acetate. These 9β,11β-epoxides can be reacted alternatively at 0° to −70° with hydrogen fluoride in a suitable inert solvent such as tetrahydrofuran or at about 0° with hydrogen chloride in a suitable inert solvent such as chloroform to yield the 9α-fluoro-11β-hydroxy and 9α-chloro-11β-hydroxy compounds of this invention, respectively.

The 9α-halo-11-keto compounds of this invention are preferably manufactured by oxidation of the afore-mentioned 9α,11β-halohydrins with chromium trioxide in pyridine. As a specific example of this process, reaction of 9α-fluoro-11β-hydroxy-17β-methylsulfonylandrost-4-en-3-one with chromium trioxide in pyridine results in 9α-fluoro-17β-methylsulfonylandrost-4-ene-3,11-dione.

The 9α-halo-11β-hydroxy compounds of this invention are useful as a result of their valuable pharmacological properties. They exhibit hormonal activities as exemplified by their ability to enhance glycogen deposition in the liver, i.e. neoglycogenetic activity; their ability to inhibit the edema associated with inflammatory states, i.e. antiinflammatory activity; and their ability to promote proliferation of the endometrial gland, i.e. progestational activity.

As is evident from the discussion supra, the 11-oxygenated 17-alkylsulfinyl- and 17-alkylsulfonylandrost-4-en-3-ones of this invention are useful as a result of their ability to serve as intermediates in the manufacture of the instant 9α,11β-halohydrins.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A nutrient medium is prepared having a composition of 20 parts of a commercial enzymatic digest of lactalbumin, 50 parts of dextrose, and 3 parts of corn steep liquor, diluted to 1,000 parts by volume with tap water and adjusted to a pH of about 4.5 with concentrated hydrochloric acid. In a suitable vessel, 5,600 parts of this medium is sterilized by the addition of live steam under pressure to a temperature of about 110–120°, cooled, and inoculated with a spore suspension of *Rhizopus stolonifer* ATCC 6227-b. Growth of the microorganism is allowed to continue for about 48 hours at a temperature of about 25°, during which time constant aeration and agitation suitable to permit its submerged growth throughout the medium is maintained. A solution of 1.4 parts of 17β-methysulfonylandrost-4-en-3-one in a minimal quantity of ethanol is added and fermentation in the presence of the steroid substrate is continued for an additional 24 hours at 25°. The culture is extracted twice with equal volumes of methylene chloride and the extract separated and concentrated to a small volume under reduced pressure. The concentrate is washed successively with 2% sodium bicarbonate solution and with water, then evaporated to dryness in vacuo. The residual oil is crystallized by trituration with ether. Two recrystallizations from tetrahydrofuran-ether followed by one recrystallization from aqueous ethanol affords pure 11α-hydroxy-17β-methylsulfonylandrost-4-en-3-one, M.P. 267–268°; $[\alpha]_D = +105°$.

By substituting an equivalent quantity of 17α-n-propylsulfonylandrost-4-en-3-one and otherwise proceeding according to the herein described processes, 11α-hydroxy-17α-n-propylsulfonylandrost-4-en-3-one is obtained.

*Example 2*

A solution of 6.01 parts of 11α-hydroxy-17β-methylsulfonylandrost-4-en-3-one in 250 parts of pyridine is added to 6.01 parts of chromium trioxide in 250 parts of pyridine while keeping the temperature at 0–5°. The mixture is allowed to stand at room temperature for about 16 hours, then poured into 2,000 parts of water. The suspension is extracted with 2,500 parts of methylene chloride and the methlyene chloride solution is filtered from a small quantity of insoluble material, then evaporated to dryness. Crystallization of the residue from alcohol affords 17β-methylsulfonylandrost-4-ene-3,11-dione, M.P. 289–291°.

By substituting an equivalent quantity of 11α-hydroxy-17α-n-propylsulfonylandrost-4-en-3-one and otherwise proceeding according to the herein described processes, 17α-n-propylsulfonylandrost-4-ene-3,11-dione is obtained.

*Example 3*

A mixture of one part of 17β-methylsulfonylandrost-4-ene-3,11-dione, 18 parts of ethylene glycol, 88 parts of benzene, and 0.05 part of p-toluenesulfonic acid monohydrate is heated at reflux with stirring for 6 hours, during which time the resulting water is removed by means of a water separator. The reaction mixture is cooled, diluted with ether, washed with aqueous sodium bicarbonate, and concentrated to dryness in vacuo. This residue is dissolved in 100 parts of a methanolic solution containing 1.5 parts of sodium borohydride and 5 parts of 50% aqueous sodium hydroxide, and the resulting solution heated at reflux for 5 hours, then allowed to stand at room temperature for 16 hours.

The latter reaction mixture is diluted with methylene chloride, washed with water, and evaporated to dryness at reduced pressure. To a solution of this residue in 80 parts of methanol is added 4 parts of 6N aqueous hydrochloric acid and the resulting mixture heated at reflux for about 10 minutes, then diluted with water, and extracted with ethyl acetate. This organic extract is evaporated to dryness in vacuo and the residue crystallized from acetone-petroleum ether to afford pure 11β-hydroxy-17β-methylsulfonylandrost-4-en-3-one which exhibits infrared maxima at 2.85, 6.0, 6.2, 7.75 and 8.8 microns.

By substituting an equivalent quantity of 17α-n-propylsulfonylandrost-4-ene-3,11-dione and otherwise proceeding according to the herein described processes, 11β-hydroxy-17α-n-propylsulfonylandrost-4-en-3-one is obtained.

*Example 4*

To a mixture of one part of 11β-hydroxy-17β-methylsulfonylandrost-4-en-3-one, 40 parts of dimethylformamide, and 2 parts of pyridine is added dropwise, with stirring, 2.58 parts of methanesulfonyl chloride. Stirring is continued for about one hour and the mixture is diluted with water. The resulting precipitate is collected by filtration and recrystallized from aqueous acetone to yield pure 17β-methylsulfonylandrosta-4,9(11)-dien-3-one, M.P. 196–197.5°.

By substituting an equivalent quantity of 11β-hydroxy-17α-n-propylsulfonylandrost-4-en-3-one and otherwise proceeding according to the herein described processes, 17α-n-propylsulfonylandrosta-4,9(11)-dien-3-one is obtained.

*Example 5*

To a solution of 3.65 parts of 17β-methylsulfonylandrosta-4,9(11)-dien-3-one in 150 parts of dioxane is added 2.2 parts of N-bromoacetamide and 15 parts of 1N perchloric acid. The mixture is allowed to stand for 20 minutes, then treated successively with 80 parts of 2% aqueous sodium sulfite solution and 800 parts of water. The solution is cooled by immersion in an ice bath and is purged by means of a stream of nitrogen. The crude product is collected by filtration, then recrystallized once from ethyl acetate-petroleum ether and twice from aqueous acetone to afford pure 9α-bromo-11β-hydroxy-17β-methylsulfonylandrost-4-en-3-one, M.P. 138–140° (dec.). This substance exhibits an ultraviolet maximum at 242 millimicrons with extinction coefficient at 15,500; and displays also maxima in the infrared at 2.88, 5.97, 7.72, and 8.80 microns.

By substituting an equivalent quantity of 17α-n-propylsulfonylandrosta-4,9(11)-dien-3-one and otherwise proceeding according to the herein described processes, 9α-bromo-11β-hydroxy-17α-n-propylsulfonylandrost-4-en-3-one is obtained.

*Example 6*

A mixture of 2.9 parts of 9α-bromo-11β-hydroxy-17β-methylsulfonylandrost-4-en-3-one, 1.5 parts of potassium acetate, and 20 parts of ethanol is heated at reflux in a nitrogen atmosphere for one and one-half hours. The reaction mixture is diluted with about 300 parts of water and the resulting crystalline product collected by filtration and recrystallized from ethyl acetate to afford pure 9β,11β-epoxy-17β-methylsulfonylandrost-4-en-3-one, M.P. 222–224°.

By substituting an equivalent quantity of 9α-bromo-11β-hydroxy-17α-n-propylsulfonylandrost-4-en-3-one and otherwise proceeding according to the herein described processes, 9β,11β-epoxy-17α-n-propylsulfonylandrost-4-en-3-one is obtained.

*Example 7*

A solution of 1.31 parts of hydrogen fluoride in 2.19 parts of tetrahydrofuran is cooled by means of a Dry Ice-acetone bath. To this cooled stirred solution is added dropwise a solution of 1.06 parts of 9β,11β-epoxy-17β-methylsulfonylandrost-4-en-3-one in 10.5 parts of chloroform. The reaction mixture is stirred for about 3½ hours while the temperature is allowed to rise to 0°, then neutralized with a solution of 5 parts of potassium carbonate in 300 parts of water. This mixture is extracted with chloroform, the chloroform extracts combined, dried over anhydrous sodium sulfate, and evaporated to dryness in vacuo. This residue is recrystallized first from acetone-petroleum ether, then from aqueous ethanol to afford pure 9α-fluoro-11β-hydroxy-17β-methylsulfonylandrost-4-en-3-one, M.P. 272–274°.

By substituting an equivalent quantity of 9β,11β-epoxy-17α-n-propylsulfonylandrost-4-en-3-one and otherwise proceeding according to the herein described processes, 9α-fluoro-11β-hydroxy-17α-n-propylsulfonylandrost-4-en-3-one is obtained.

*Example 8*

To an ice-cold solution of one part of 9β,11β-epoxy-17β-methylsulfonylandrost-4-en-3-one in 30 parts of chloroform is added 30 parts of a 0.20 N solution of hydrogen chloride in chloroform and the resulting mixture allowed to stand for 45 minutes. This mixture is washed with water, then the organic layer separated, dried over sodium sulfate, and evaporated to dryness in vacuo. Recrystallization of the residue first from acetone-petroleum ether then from aqueous ethanol results in pure 9α-chloro- 11β-hydroxy-17β-methylsulfonylandrost-4-en-3-one, M.P. 193–196°.

By substituting an equivalent quantity of 9β,11β-epoxy-17α-n-propylsulfonylandrost-4-en-3-one and otherwise proceeding according to the herein described processes, 9α-chloro-11β-hydroxy-17α-n-propylsulfonylandrost-4-en-3-one is obtained.

Example 9

To a suspension of 4 parts of chromium trioxide in 100 parts of pyridine is added dropwise at 0–5° a solution of 4 parts of 9α-fluoro-11β-hydroxy-17β-methylsulfonylandrost-4-en-3-one in 125 parts of pyridine. The reaction mixture is allowed to warm to room temperature and stored for about 16 hours. The mixture is then poured into 1000 parts of water and the resulting suspension is extracted with 1250 parts of methylene chloride. The methylene chloride solution is filtered from a small quantity of insoluble material, then evaporated to dryness. Crystallization of the residue from alcohol affords 9α-fluoro-17β-methylsulfonylandrost-4-ene-3,11-dione. This diketone displays infrared maxima at 5.85, 6.0, 6.2, 7.7, and 8.8 microns.

Substitution of an equivalent quantity of 9α-fluoro-11β-hydroxy-17α-n-propylsulfonylandrost-4-en-3-one in the instant process results in 9α-fluoro-17α-n-propylsulfonylandrost-4-ene-3,11-dione.

Example 10

An ethanol solution of 1.9 parts of 17β-methylsulfonylandrost-4-en-3-one (M.P. 222–223.5°) is fermented according to the procedure of Example 1. The methylene chloride extract is concentrated to dryness and the residue triturated with dry ether, then crystallized from ethanol to afford 11α-hydroxy-17β-methylsulfinylandrost-4-en-3-one, M.P. 297–299° (dec.).

By substituting equivalent quantities of 17β-methylsulfinylandrost-4-en-3-one (M.P. 152–154° and 170–172°) or 17β-n-butylsulfinylandrost-4-en-3-one, and otherwise proceeding according to the herein described processes; 11α-hydroxy-17β-methylsulfinylandrost-4-en-3-one (M.P. 223–224°) and 17β-n-butylsulfinyl-11α-hydroxyandrost-4-en-3-one are obtained.

Example 11

An ethanol solution of 3 parts of 17α-methyl-thioandrost-4-en-3-one is fermented by the procedure described in Example 1. The residue from the methylene chloride extract is adsorbed on silica gel and the column eluted successively with ethyl acetate in benzene, ethyl acetate, 20% acetone in ethyl acetate, and finally 40% acetone in ethyl acetate. Concentration of the latter eluate to dryness in vacuo results in 11α-hydroxy-17α-methylsulfinylandrost-4-en-3-one, M.P. 225–226° (dec.); $[\alpha]_D = -88°$ (chloroform).

Example 12

To a solution of 2.2 parts of chromium trioxide in 50 parts of pyridine is added a solution of 2 parts of 11α-hydroxy-17β-methylsulfinylandrost-4-en-3-one (M.P. 223–224°) in 50 parts of pyridine. The reaction mixture is allowed to stand at room temperature for about 4 hours, then diluted with water and extracted with ethyl acetate. The organic layer is concentrated to dryness in vacuo and the residue adsorbed on silica gel. The chromatographic column is eluted successively with ethyl acetate in benzene, ethyl acetate, and 50% acetone in ethyl acetate. Concentration of the latter eluate in vacuo yields 17β-methylsulfinylandrost-4-ene-3,11-dione, M.P. 234–235°; $[\alpha]_D = +258°$.

By substituting an equivalent quantity of 17β-n-butylsulfinyl-11α-hydroxyandrost-4-en-3-one and otherwise proceeding according to the herein described processes; 17β-n-butylsulfinylandrost-4-ene-3,11-dione is obtained.

Example 13

To a solution of 3.5 parts of 17β-methylsulfinylandrost-4-ene-3,11-dione in 1,000 parts of benzene is added a solution of 1.4 parts of perbenzoic acid in benzene. The reaction mixture is allowed to stand at room temperature for about 2 hours, washed with aqueous sodium hydroxide, and adsorbed on silica gel. Elution of the chromatographic column with ethyl acetate affords 17β-methylsulfonylandrost-4-ene-3,11-dione, M.P. 286–288°, which is identical with the substance described in Example 2.

Example 14

A mixture of one part of 17β-methylsulfinylandrost-4-ene-3,11-dione (M.P. 234–235°), 20 parts of ethylene glycol, 100 parts of benzene and 0.05 part of p-toluenesulfonic acid monohydrate is heated at reflux for about 6 hours, during which time the water formed is continuously removed by means of a water separator. The reaction mixture is cooled, washed with aqueous sodium bicarbonate, and evaporated to dryness in vacuo. The residue is dissolved in a solution of 2 parts of sodium borohydride and 5 parts of 10% aqueous sodium hydroxide in 87 parts of methanol, and the resulting solution is allowed to stand at room temperature for about 16 hours. It is then diluted with methylene chloride, washed with water, and concentrated to dryness. To a solution of the residue in 130 parts of methanol is added 5 parts of dilute aqueous hydrochloric acid and the resulting mixture heated at reflux for about 10 minutes, then diluted with water and extracted with ethyl acetate. Concentration of this organic extract affords 11β-hydroxy-17β-methylsulfinylandrost-4-en-3-one, which displays infrared maxima at 3.0, 6.0, 6.2, and 9.6 microns.

The substitution of an equivalent quantity of 17β-n-butylsulfinylandrost-4-ene-3,11-dione in the instant process results in 17β-n-butylsulfinyl-11β-hydroxyandrost-4-en-3-one.

Example 15

To a solution of one part of 11β-hydroxy-17β-methylsulfinylandrost-4-en-3-one and one part of pyridine in 25 parts of dimethylformamide is added dropwise 1.3 parts of methanesulfonyl chloride and the mixture stirred for about one hour, diluted with water, and extracted with methylene chloride. This extract is concentrated to dryness in vacuo and the residue dissolved in 25 parts of dioxane. To this dioxane solution is added 0.3 part of N-bromoacetamide and 7 parts of 1 normal perchloric acid and the mixture allowed to stand for about 30 minutes, then treated successively with 10 parts of dilute aqueous sodium sulfite and water, and extracted with benzene. The benzene extract is adsorbed on silica gel and the chromatographic column eluted with 50% acetone in ethyl acetate to afford 9α-bromo-11β-hydroxy-17β-methylsulfinylandrost-4-en-3-one. It exhibits maxima in the infrared at 3.0, 6.0, 6.2 and 9.6 microns, and also an ultraviolet maximum at 242 millimicrons with extinction coefficient of 15,100.

By substituting an equivalent quantity of 17β-n-butylsulfinyl-11β-hydroxyandrost-4-en-3-one and otherwise proceeding according to the herein described processes, 9α-bromo-17β-n-butylsulfinyl-11β-hydroxyandrost-4-en-3-one is obtained.

Example 16

A mixture of 3 parts of 9α-bromo-11β-hydroxy-17β-methylsulfinylandrost-4-en-3-one, 1.4 parts of potassium acetate and 20 parts of ethanol is heated at reflux in a nitrogen atmosphere for about 2 hours, then diluted with water. The resulting precipitate is collected by filtration and dried to afford 9β,11β-epoxy-17β-methyl-sulfinylandrost-4-en-3-one which exhibits infrared maxima at 6.0, 6.2, and 9.6 microns.

The substitution of an equivalent quantity of 17β-n-butylsulfinyl-9α-bromo-11β-hydroxyandrost-4-en-3-one in the instant process results in 17β-n-butylsulfinyl-9β,11β-epoxyandrost-4-en-3-one.

*Example 17*

A solution of 2 parts of 9β,11β-epoxy-17β-methylsulfinylandrost-4-en-3-one in 15 parts of chloroform is added dropwise at −30° to a solution of 1.5 parts of hydrogen fluoride in 2.5 parts of tetrahydrofuran and the resulting mixture is stirred for about 4 hours during which time the temperature rises gradually to 0°. Aqueous potassium carbonate is added to neutrality and the resulting mixture extracted with chloroform. This organic extract is dried over anhydrous sodium sulfate and evaporated to dryness in vacuo to afford 9α-fluoro-11β-hydroxy-17β-methylsulfinylandrost-4-en-3-one. It displays infrared maxima at 3.0, 6.0, 6.2, and 9.6 microns.

The substitution of an equivalent quantity of 17β-n-butylsulfinyl-9β,11β-epoxyandrost-4-en-3-one in the instant process affords 17β-n-butylsulfinyl-19α-fluoro-11β-hydroxyandrost-4-en-3-one.

*Example 18*

A solution of one part 9β,11β-epoxy-17β-methylsulfinylandrost-4-en-3-one in 35 parts of chloroform is treated, at 0°, with 31 parts of 0.2 N hydrogen chloride in chloroform and the mixture stirred for about one hour. The reaction mixture is washed with water, dried over anhydrous sodium sulfate, and evaporated to dryness in vacuo to afford 9α-chloro-11β-hydroxy-17β-methylsulfinylandrost-4-en-3-one. Its infrared absorption spectrum displays maxima at 2.95, 6.0, 6.2, and 9.65 microns.

By substituting an equivalent quantity of 17β-n-butylsulfinyl-9β,11β-epoxyandrost-4-en-3-one and otherwise proceeding according to the herein described processes 17β-n-butylsulfinyl-9α-chloro-11β-hydroxyandrost - 4 - en-3-one is obtained.

What is claimed is:
1. 9α-bromo-11β-hydroxy - 17 - methylsulfonylandrost-4-en-3-one.
2. 9α-chloro-11β-hydroxy - 17 - methylsulfonylandrost-4-en-3-one.
3. 9α-fluoro-11β-hydroxy - 17 - methylsulfonylandrost-4-en-3-one.
4. 9α-fluoro-11β-hydroxy - 17 - methylsulfinylandrost-4-en-3-one.
5. A member selected from the group consisting of compounds represented by the structural formulae

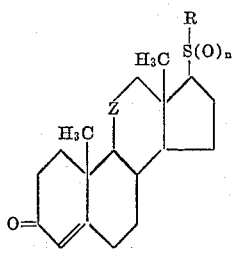

and

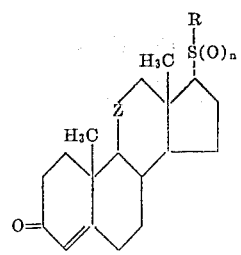

wherein Z is selected from the group consisting of carbonyl, α-hydroxymethylene, and β-hydroxymethylene radicals; R is a lower alkyl radical; and $n$ is a positive integer less than 3.
6. 11α-hydroxy-17-methylsulfonylandrost-4-en-3-one.
7. 17-methylsulfonylandrost-4-ene-3,11-dione.
8. 11α-hydroxy-17-methylsulfinylandrost-4-en-3-one.
9. 17-methylsulfinylandrost-4-ene-3,11-dione.
10. A member selected from the group consisting of compounds of the structural formulae

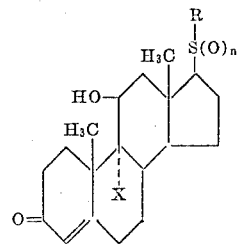

and

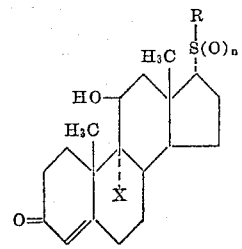

wherein X is a halogen atom having an atomic weight less than 100, R is a lower alkyl radical, and $n$ is a positive integer less than 3.

No references cited.